(12) United States Patent
Stegmaier et al.

(10) Patent No.: US 10,689,066 B2
(45) Date of Patent: Jun. 23, 2020

(54) METHOD FOR ASCERTAINING A WHEEL CIRCUMFERENCE OF A DRIVEN WHEEL, CONTROL METHOD FOR A DRIVE MOTOR, CONTROL UNIT, AND VEHICLE

(71) Applicant: Robert Bosch GmbH, Stuttgart (DE)

(72) Inventors: Juergen Stegmaier, Tuebingen (DE); Rinaldo Greiner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 15/999,195

(22) Filed: Aug. 16, 2018

(65) Prior Publication Data
US 2019/0054979 A1 Feb. 21, 2019

(30) Foreign Application Priority Data

Aug. 16, 2017 (DE) .......................... 10 2017 214 294

(51) Int. Cl.
| | | |
|---|---|---|
| *B62M 6/50* | (2010.01) | |
| *B62M 6/55* | (2010.01) | |
| *B62M 6/40* | (2010.01) | |
| *B60W 10/08* | (2006.01) | |
| *B60W 40/12* | (2012.01) | |

(52) U.S. Cl.
CPC .............. *B62M 6/50* (2013.01); *B60W 10/08* (2013.01); *B60W 40/12* (2013.01); *B62M 6/40* (2013.01); *B62M 6/55* (2013.01); *B60W 2520/105* (2013.01); *B60W 2520/28* (2013.01); *B60W 2530/18* (2013.01)

(58) Field of Classification Search
CPC ............ B62M 6/50; B62M 6/40; B62M 6/55; B60W 40/12; B60W 10/08; B60W 2530/18; B60W 2520/28; B60W 2520/105
USPC ........................................................ 701/29.1
See application file for complete search history.

(56) References Cited

U.S. PATENT DOCUMENTS 5,847,645 A * 12/1998 Boesch ................. B60C 23/061
340/442

FOREIGN PATENT DOCUMENTS

| DE | 102010000867 A1 | 7/2011 |
|---|---|---|
| DE | 102012201881 A1 | 1/2013 |
| DE | 102016006869 A1 | 2/2017 |
| EP | 1213561 A1 * | 6/2002 |
| EP | 1213561 A1 | 6/2002 |
| WO | WO2007074048 A1 * | 5/2007 |
| WO | 2007074048 A1 | 7/2007 |

* cited by examiner

*Primary Examiner* — Maceeh Anwari
(74) *Attorney, Agent, or Firm* — Norton Rose Fulbright US LLP; Gerard Messina

(57) ABSTRACT

A method for ascertaining a wheel circumference of a driven wheel of a vehicle includes measuring a rotational speed of the driven wheel during a predefined time span, measuring an acceleration of the vehicle in the direction of the longitudinal axis of the vehicle during a predefined time span, determining a distance traveled by the vehicle based on the measured acceleration, and determining the wheel circumference of the driven wheel based on the measured rotational speed and the ascertained distance traveled.

4 Claims, 3 Drawing Sheets

METHOD FOR ASCERTAINING A WHEEL CIRCUMFERENCE OF A DRIVEN WHEEL, CONTROL METHOD FOR A DRIVE MOTOR, CONTROL UNIT, AND VEHICLE

CROSS-REFERENCE TO RELATED APPLICATIONS

The present application claims priority under 35 U.S.C. § 119 to DE 10 2017 214 294.4, filed in the Federal Republic of Germany on Aug. 16, 2017, the content of which is hereby incorporated by reference herein in its entirety.

FIELD OF THE INVENTION

The present invention relates to a method for ascertaining a wheel circumference of a driven wheel, and to a control method for a drive motor, as well as to a control unit for implementing the methods and a vehicle having the control unit.

BACKGROUND

The document DE 10 2012 201 881 A1 describes a control set-up for an electric bicycle, including an acceleration sensor for detecting somebody starting to ride.

A determination of the angle of inclination of a path of travel as a function of a detected acceleration and of a measured wheel speed is described in the document EP 1 213 561 A1.

As a rule, calculation of the speed in bicycle computers or e-bike systems, i.e., electric bicycles, requires knowledge of the wheel circumference. In the case of bicycle computers, the wheel circumference must be measured by the customer, or a literature value for the specific tire model must be found and programmed in. In the case of an electric bicycle, the wheel circumference is often permanently programmed in by the bicycle manufacturer and cannot be adjusted by the end user, since the wheel circumference has a decisive influence on the frequently statutory limiting speed of the electric bicycle. However, when changing the tire, for example, from street tires to knobby tires, the wheel circumference can change. If the wheel circumference of the e-bike system is not adjusted in accordance with the change, then inaccuracies occur in the calculation of speed, as well as in further tachometer functions. In addition, power losses of the electric bicycle can occur due to a change in the tire circumference. For example, the electric bicycle having motor assistance can no longer reach the speed attained in the condition as shipped.

SUMMARY

An object of the present invention is to obtain an automatic determination of the wheel circumference by which to control the vehicle.

The present invention relates to ascertaining a wheel circumference of a driven wheel of a vehicle. During a predefined time span, a rotational speed of the driven wheel is measured, and an acceleration and/or acceleration characteristic of the vehicle in the direction of the longitudinal axis of the vehicle is measured. Subsequently, a distance traveled by the vehicle is ascertained as a function of the acceleration and/or of the acceleration characteristic measured during the time span. The wheel circumference of the driven wheel is determined as a function of the measured rotational speed and the distance traveled. The method has an advantage that the actual wheel circumference is determined automatically. In this manner, the accuracy of different tachometer functions is maintained in spite of a tire change producing a changed wheel circumference. For example, the tachometer functions include the current speed of the vehicle and/or the distance in kilometers traveled by the vehicle on a trip. In addition, the method has the advantage that the need for the programming operation of the tachometer for the current tire circumference, in response to a tire change or after purchase of the tachometer, is eliminated. This also provides the advantage that a source of error due to incorrect programming is eliminated.

In an example embodiment, an acceleration sensor signal is calibrated prior to the predefined time span, in order to measure a rotational speed and to measure the acceleration. The calibration is carried out with the vehicle at rest. In the calibration step, an acceleration offset in the direction of the longitudinal axis of the vehicle is determined as a function of a measured acceleration. The calibration advantageously allows the wheel circumference to be determined more accurately.

According to an example embodiment of the present invention, a control method for a drive motor of the vehicle includes acquiring a wheel circumference, for example, from an electrical storage device, the wheel circumference having preferably been determined by the method for ascertaining the wheel circumference of the driven wheel of the vehicle. Subsequently, the drive motor is controlled as a function of the acquired wheel circumference. Using the method, a drive unit including the drive motor can advantageously be mounted to different frame geometries of, e.g., electric bicycles, the accuracy of the limiting speed and different tachometer functions of the electric bicycles being retained in spite of varied wheel circumferences, and/or the expenditure for the wheel manufacturer to adjust the control unit, in order to execute the method, being reduced. For a manufacturer of an electric bicycle, this also prevents a possible mistake of incorrectly programming a wheel circumference into a control unit of the electric bicycle.

The present invention further relates to a control unit for the vehicle. During the predefined time span, the control unit measures a rotational speed of a driven wheel of the vehicle using a speed sensor and measures an acceleration of the vehicle in the direction of the longitudinal axis of the vehicle using an acceleration sensor. Subsequently, with the aid of an arithmetic unit, the control unit ascertains the distance traveled by the vehicle during the time span as a function of the measured acceleration. In addition, using the arithmetic unit, the control unit is configured to determine a wheel circumference of the driven wheel of the vehicle as a function of the measured rotational speed and the ascertained distance. Accordingly, the control unit can advantageously implement the method of the present invention, that is, automatically determine a current wheel circumference. In this manner, for example, slight changes in tire circumference due to, e.g., low air pressure in the tire or a worn tire tread, are determined, and consequently, the accuracy of the tachometer functions is increased.

The arithmetic unit of the control unit is preferably configured to carry out a calibration of an acceleration sensor signal of the acceleration sensor prior to the predefined time span, with the vehicle at rest. Using the calibration, an acceleration offset in the direction of the longitudinal axis of the vehicle is determined as a function of a measured acceleration in the direction of the longitudinal axis of the vehicle. Subsequently, the arithmetic unit is configured to ascertain the wheel circumference additionally as a function of the determined acceleration offset.

In an example embodiment, the control unit is configured to generate an output signal for controlling the drive motor of the vehicle as a function of the determined wheel circumference.

The present invention also relates to a vehicle, in particular, an electric bicycle, having a control unit of the present invention.

The present invention is explained below with reference to preferred example embodiments and appended figures.

DETAILED DESCRIPTION

Figure 1:
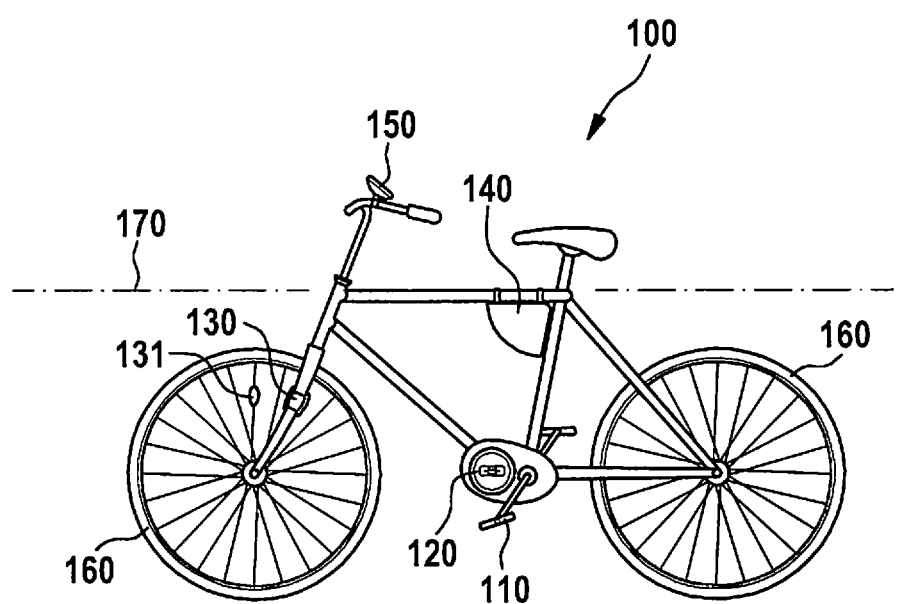
FIG. 1 illustrates an electric bicycle according to an example embodiment of the present invention.

An electric bicycle 100 in the form of a vehicle is depicted in FIG. 1. Electric bicycle 100 includes pedals 110 and a drive motor 120, in particular, an electric motor, for propelling electric bicycle 100. Electric bicycle 100 further includes a speed sensor 130. Speed sensor 130 is, for example, a Reed sensor, which measures a rotational speed or a number of revolutions of a magnet 131 situated on the spokes of a driven wheel 160 of electric bicycle 100. Electric bicycle 100 further includes an acceleration sensor 140. Acceleration sensor 140 is situated, for example, on the frame of electric bicycle 100 and/or in a control unit 150. Acceleration sensor 140 measures an acceleration of electric bicycle 100 in the direction of longitudinal axis 170 of electric bicycle 100, that is, for example, in the direction of forward travel of electric bicycle 100. Control unit 150 is situated on electric bicycle 100, as well. Drive motor 120 of electric bicycle 100 is preferably controlled by control unit 150 as a function of a magnitude of a pressure applied by a bicycle rider of electric bicycle 100 to a pedal 110. For example, a limiting speed prescribed by law, i.e., a maximum speed, of 25 km/h is provided in the context of the control of electric motor 120. In normal operation, for example, the speed of electric bicycle 100 is determined as a function of rotational speed n and wheel circumference U of drive wheel 160. Therefore, according to the related art, wheel circumference U is programmed into control unit 150 by the manufacturer of an electric bicycle 100 and is consequently stored in a storage device of control unit 150. Accordingly, in the case of a flat tire and/or replacement of the tire and/or the wheel rim of wheel 160, the related art does not provide for automatic adjustment of stored wheel circumference U. Consequently, in the related art, e.g., the tachometer functions and the limiting speed have a small degree of inaccuracy. In addition, the programming of wheel circumference U in accordance with the related art is susceptible to errors and is costly for the manufacturer of electric bicycle 100.

Figure 2A:
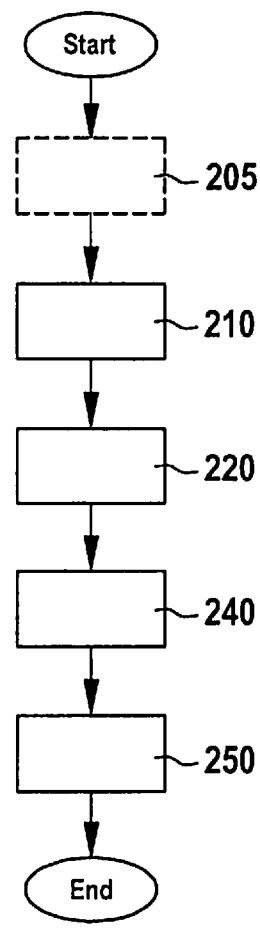
FIG. 2a is a flowchart that illustrates a method for ascertaining a wheel circumference according to an example embodiment of the present invention.

A flowchart of a method for ascertaining wheel circumference U of a driven wheel 160 of a vehicle 100 is represented in FIG. 2, the vehicle 100 being, for example, an electric bicycle as shown in FIG. 1. The method can include an optional calibration 205 of an acceleration sensor signal of acceleration sensor 140. Calibration 205 takes place with electric bicycle 100 at rest. For the calibration, an acceleration offset OS in the direction of longitudinal axis 170 of vehicle 100 is determined as a function of an acceleration a measured with the aid of acceleration sensor 140. Subsequently, rotational speed n of driven wheel 160 of electric bicycle 100 is measured 210 during a predefined time span t. As an alternative to measuring 210 rotational speed n, the number of revolutions k can be measured in step 210. At the same time, acceleration a of electric bicycle 100 in the longitudinal direction of electric bicycle 100 is measured during predefined time span t. During predefined time span t, acceleration a can vary, that is, have an acceleration characteristic. The predefined time span is, for example, a time period between 0.1 seconds and 5 minutes. Subsequently, a distance s traveled by electric bicycle 100 is ascertained as a function of the acceleration measured during predefined time span t. Distance s traveled is ascertained 240, for example, by integrating measured acceleration a or the acceleration characteristic twice, and/or by summing the acceleration values during predefined time span t in accordance with formula 1.

$$s = \int_{t_0}^{t_1} \int_{t_0}^{t_1} a(t) \cdot t \, dt^2 \approx \sum_{t_0}^{t_1} \sum_{t_0}^{t_1} a_n \cdot t_n \quad \text{(formula 1)}$$

Finally, wheel circumference U is determined 250 as a function of the revolutions k measured during predefined time span t and of distance s traveled, the number of revolutions k being measured or being ascertained from rotational speed n. Wheel circumference U is determined 250, for example, according to formula 2.

$$U = \frac{s}{k} \quad \text{(formula 2)}$$

After determination 250, determined wheel circumference U can be stored, for example, in an electrical storage device of control unit 150.

Subsequently, for example, a speed v of electric bicycle 100 is optionally ascertained as a function of rotational speed n of driven wheel 160 and of stored wheel circumference U. Since stored wheel circumference U corresponds to determined or actual wheel circumference U of electric bicycle 100, ascertained speed v of electric bicycle 100 is highly accurate. In a subsequent, optional step, ascertained speed v is indicated to the bicycle rider of the electric bicycle, for example, on a display of control unit 150 in the form of a tachometer function.

Figure 2B:
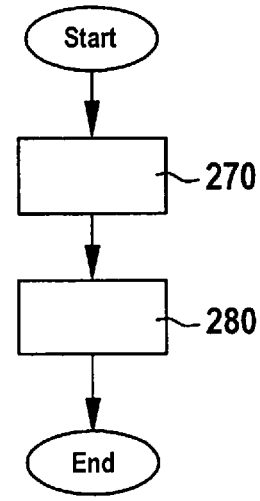
FIG. 2b is a flowchart that illustrates a control method for a drive motor according to an example embodiment of the present invention.

A flowchart of a control method for drive motor 120 is represented in FIG. 2b. The control method for drive motor 120 starts with the acquisition 270 of a wheel circumference U. Wheel circumference U is acquired, in particular, from an electrical storage unit of control unit 150, wheel circumference U having been determined, in particular, according to the method, described in FIG. 2a, for ascertaining wheel circumference U of driven wheel 160 of the vehicle. Subsequently, drive motor 120 is controlled 280 as a function of determined wheel circumference U.

Figure 3:
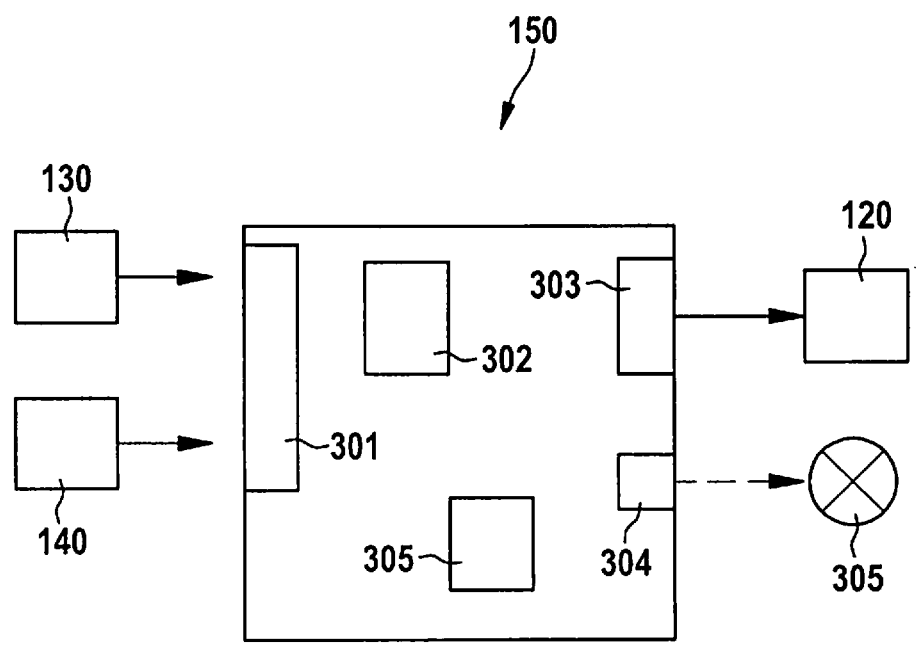
FIG. 3 illustrates a control unit according to an example embodiment of the present invention.

A block diagram of control unit 150 for implementing one of the methods of the present invention is shown in FIG. 3. Control unit 150 includes at least an input signal interface 301, an arithmetic unit 302, an electrical storage unit 305, an output signal interface 303, and a display connecting socket 304. Control unit 150 measures rotational speed n of driven wheel 160 during a predefined time span t, that is, during a time period between starting time to and ending time ti, using speed sensor 130. Control unit 150 is connected to speed sensor 130, in particular, via input signal interface 301. In addition, during predefined time span t, control unit 150 simultaneously measures acceleration a of electric bicycle 100 in longitudinal direction 170 of electric bicycle 100, using acceleration sensor 140. Acceleration sensor 140 can be situated in control unit 150. Alternatively or optionally, control unit 150 can be connected to acceleration sensor 140, in particular, via input signal interface 301 or a second input signal interface 301. Arithmetic unit 302 ascertains, e.g., according to formula 1, the distance s traveled by the electric bicycle during predefined time span t. Afterwards, arithmetic unit 302 determines wheel circumference U of driven wheel 160 as a function of distance s traveled and rotational speed n measured during time span t. Determined wheel circumference U is saved, in particular, in electrical storage unit 305. Optionally, control unit 150 can be configured to generate an output signal, in particular, at output signal interface 303, to control 280 drive motor 120 as a function of wheel circumference U. In addition, on an indicating device 305, for example, on a display of control unit 150, control unit 150 is optionally configured to indicate a wheel circumference U or information, e.g., tachometer functions, which are ascertained as a function of wheel circumference U. The indicating device is connected to control unit 150 by, for example, display connecting socket 304.

What is claimed is:

1. A method comprising:
   measuring, using a rotation speed sensor mounted on a bicycle, a rotational speed of a driven wheel of the bicycle during a predefined time span;
   measuring, using an acceleration sensor mounted on the bicycle, an acceleration of the bicycle in a direction of a longitudinal axis of the bicycle during the predefined time span;
   determining, using a control unit mounted on the bicycle, a distance traveled by the bicycle during the predefined time span using the measured acceleration obtained from the acceleration sensor;
   determining, using the control unit, a wheel circumference of the driven wheel of the bicycle using the measured rotational speed obtained from the rotation speed sensor and the determined distance; and
   controlling, using the control unit, a drive motor of the bicycle based on the determined wheel circumference;
   prior to the predefined time span and while the bicycle is at rest, calibrating the acceleration sensor wherein the calibrating includes, based on a measured acceleration by the acceleration sensor, determining an acceleration offset in the direction of the longitudinal axis of the bicycle, which is applied in the determining of the wheel circumference.

2. A control unit of a bicycle, comprising:
   a rotation speed sensor mounted on a first part of the bicycle;
   an acceleration sensor mounted on a second part of the bicycle; and
   an arithmetic unit mounted on a third part of the bicycle and communicatively coupled to the rotation speed sensor and the acceleration sensor;
   wherein:
      the rotation speed sensor is configured to measure a rotational speed of a driven wheel of the bicycle during a predefined time span;
      the acceleration sensor is configured to measure an acceleration of the bicycle in a direction of a longitudinal axis of the bicycle during the predefined time span; and
      the arithmetic unit is configured to:
         determine a distance traveled by the bicycle during the predefined time span based on the measured acceleration obtained by the arithmetic unit from the acceleration sensor;
         determine a wheel circumference of the driven wheel based on the determined distance and measured rotational speed obtained by the arithmetic unit from the rotation speed sensor; and
         control a drive motor of the bicycle based on the determined wheel circumference; and
      wherein:
         the arithmetic unit is configured to, prior to the predefined time span and while the bicycle is at rest, calibrate the acceleration sensor; and
         the calibration includes, based on a measured acceleration by the acceleration sensor, determining an acceleration offset in the direction of the longitudinal axis of the bicycle, which is applied in the determining of the wheel circumference.

3. The control unit as recited of claim 2, wherein the control unit is configured to generate, based on the determined wheel circumference, a control signal that is output by the control unit, to control the drive motor of the bicycle.

4. A bicycle, comprising:
   a rotation speed sensor mounted on a first part of the bicycle;
   an acceleration sensor mounted on a second part of the bicycle; and
   an arithmetic unit mounted on a third part of the bicycle and communicatively coupled to the rotation speed sensor and the acceleration sensor;
   wherein:
      the rotation speed sensor is configured to measure a rotational speed of a driven wheel of the bicycle during a predefined time span;
      the acceleration sensor is configured to measure an acceleration of the bicycle in a direction of a longitudinal axis of the bicycle during the predefined time span; and
      the arithmetic unit is configured to:
         determine a distance traveled by the bicycle during the predefined time span based on the measured acceleration obtained by the arithmetic unit from the acceleration sensor;
         determine a wheel circumference of the driven wheel based on the determined distance and measured rotational speed obtained by the arithmetic unit from the rotation speed sensor; and
         control a drive motor of the bicycle based on the determined wheel circumference; and
      wherein:
         the arithmetic unit is configured to, prior to the predefined time span and while the bicycle is at rest, calibrate the acceleration sensor; and
         the calibration includes, based on a measured acceleration by the acceleration sensor, determining an acceleration offset in the direction of the longitudinal axis of the bicycle, which is applied in the determining of the wheel circumference.

* * * * *